United States Patent
Srail et al.

(10) Patent No.: US 11,204,675 B2
(45) Date of Patent: Dec. 21, 2021

(54) ADAPTIVE INPUT COUNTERMEASURES ON HUMAN MACHINE INTERFACE

(71) Applicant: Aptiv Technologies Limited, St. Michael (BB)

(72) Inventors: Douglas A. Srail, Kokomo, IN (US); Heather L. Beineke, Westfield, IN (US)

(73) Assignee: Aptiv Technologies Limited, St. Michael (BB)

( * ) Notice: Subject to any disclaimer, the term of this patent is extended or adjusted under 35 U.S.C. 154(b) by 172 days.

(21) Appl. No.: 16/563,271

(22) Filed: Sep. 6, 2019

(65) Prior Publication Data
US 2021/0072866 A1     Mar. 11, 2021

(51) Int. Cl.
*B60W 20/50*     (2016.01)
*G06F 3/0481*     (2013.01)
*B60K 37/04*     (2006.01)
*B60W 40/08*     (2012.01)

(52) U.S. Cl.
CPC ............ *G06F 3/0481* (2013.01); *B60K 37/04* (2013.01); *B60W 20/50* (2013.01); *B60W 2040/0818* (2013.01); *B60W 2556/10* (2020.02)

(58) Field of Classification Search
None
See application file for complete search history.

(56) References Cited

U.S. PATENT DOCUMENTS

| | | | |
|---|---|---|---|
| 6,640,169 B2 | 10/2003 | Bergmann et al. | |
| 2007/0055386 A1 | 3/2007 | Mann et al. | |
| 2007/0238409 A1 | 10/2007 | Srail | |
| 2010/0256785 A1 | 10/2010 | Lloyd | |
| 2011/0304550 A1 | 12/2011 | Romera Jolliff et al. | |
| 2011/0316698 A1 | 12/2011 | Palin et al. | |
| 2012/0272177 A1* | 10/2012 | Vaghefinazari | G06F 3/0488 715/780 |
| 2013/0188081 A1 | 7/2013 | Kulas | |
| 2014/0043241 A1 | 2/2014 | Sukumar | |
| 2014/0115491 A1 | 4/2014 | Cullin et al. | |

(Continued)

FOREIGN PATENT DOCUMENTS

DE     102013221867     4/2015

OTHER PUBLICATIONS

"Extended European Search Report", EP Application No. 20193873.5, dated Feb. 12, 2021, 5 pages.

*Primary Examiner* — Henry Orr
(74) *Attorney, Agent, or Firm* — Colby Nipper PLLC (57) ABSTRACT

A vehicle system includes a human machine interface (HMI) and a controller circuit. The HMI accepts inputs from a user. The controller circuit is configured to receive a first input from the user via the HMI, anticipate a potential second input from the user via the HMI, determine potential system failures based on at least one of an operating state of the system and the potential second input, determine, based on historical data, whether an input sequence comprising the first input from the user and the potential second input from the user is likely to impact performance of the system and or one or more components of the system, and if the input sequence is likely to result in the impact to the performance of the system and or the one or more components of the system, enact at least one countermeasure to avoid or reduce the impact.

28 Claims, 3 Drawing Sheets

(56) References Cited

U.S. PATENT DOCUMENTS

| | | | |
|---|---|---|---|
| 2014/0225724 A1 | 8/2014 | Rankin et al. | |
| 2014/0250468 A1* | 9/2014 | Barr | H04N 21/4331 |
| | | | 725/62 |
| 2014/0277902 A1* | 9/2014 | Koch | G07C 5/0808 |
| | | | 701/29.1 |
| 2014/0336791 A1* | 11/2014 | Asenjo | G06Q 10/06 |
| | | | 700/44 |
| 2016/0111087 A1 | 4/2016 | Srail | |
| 2016/0360382 A1* | 12/2016 | Gross | G06F 3/016 |
| 2017/0177076 A1 | 6/2017 | Srail | |

* cited by examiner

ADAPTIVE INPUT COUNTERMEASURES ON HUMAN MACHINE INTERFACE

TECHNICAL FIELD OF DISCLOSURE

This disclosure generally relates to a vehicle system that avoids system failures.

BACKGROUND OF THE DISCLOSURE

System failures in automotive applications may result in poor user experiences increased warranty claims, and potential safety issues due to driver distraction. The system failures and/or root causes of the system failures may not be known at the time a vehicle is released for production.

SUMMARY OF THE DISCLOSURE

An example of a vehicle system includes a human machine interface (HMI) for a vehicle that accepts inputs from a user, and a controller circuit communicatively coupled to the HMI. The controller circuit is configured to receive a first input from the user via the HMI. The controller circuit is further configured to anticipate a potential second input from the user via the HMI. The controller circuit is further configured to determine potential system failures based on at least one of an operating state of the system and the potential second input. The controller circuit is further configured to determine, based on historical data, whether an input sequence comprising the first input from the user and the potential second input from the user is likely to impact performance of the system and or one or more components of the system. If the input sequence is likely to result in the impact to the performance of the system and or the one or more components of the system, the controller circuit is further configured to enact at least one countermeasure to avoid or reduce the impact.

In an example having one or more features of the vehicle system of the previous paragraph, the controller circuit modifies the HMI display to prevent the user from selecting an input.

In an example having one or more features of the vehicle system of the previous paragraph, an icon representing the input on the HMI display is disabled.

In an example having one or more features of the vehicle system of any of the previous paragraphs, the controller circuit processes a second user input through an alternate electrical circuit and/or logical path, thereby inhibiting the potential system.

In an example having one or more features of the vehicle system of any of the previous paragraphs, the controller circuit preloads a memory of the system with data related to a most likely potential second input, thereby reducing a system latency.

In an example having one or more features of the vehicle system of the previous paragraph, the most likely potential second input is based on a user input history.

In an example having one or more features of the vehicle system of any of the previous paragraphs, the most likely potential second input is based on crowd sourced data collected from identical systems installed in other vehicles.

In an example having one or more features of the vehicle system of any of the previous paragraphs, the controller circuit learns the potential system failures based on a user input history.

In an example having one or more features of the vehicle system of any of the previous paragraphs, the controller circuit learns the potential system failures based on crowd sourced data collected from identical systems installed in other vehicles.

In an example having one or more features of the vehicle system of any of the previous paragraphs, the controller circuit downloads data indicative of the potential system failures.

In an example having one or more features of the vehicle system of any of the previous paragraphs, the controller circuit further classifies the potential system failures by a severity rating.

In an example having one or more features of the vehicle system of any of the previous paragraphs, the severity rating is indicative of a level of distraction to the user.

In an example having one or more features of the vehicle system of any of the previous paragraphs, the severity rating is indicative of at least one of a system latency, a system crash, and a system reboot.

In an example having one or more features of the vehicle system of any of the previous paragraphs, data collected from one or more vehicles experiencing system failures includes at least one of a time stamp, the input sequence, and a system state preceding a system failure event.

An example of a method of operating a vehicle system includes receiving, with a controller circuit, a first input from the user via a human machine interface (HMI) for a vehicle, the controller circuit communicatively coupled to the HMI, anticipating, with the controller circuit, a potential second input from the user via the HMI, determining, with the controller circuit, potential system failures based on at least one of an operating state of the system and the potential second input, determining, with the controller circuit, based on historical data whether an input sequence comprising the first input from the user and the potential second input from the user is likely to impact performance of the system and or one or more components of the system, and if the input sequence is likely to result in the impact to the performance of the system and or the one or more components of the system, enacting, with the controller circuit, at least one countermeasure to avoid or reduce the impact.

In an example having one or more features of the method of operating a vehicle system of the previous paragraph, the controller circuit modifies an HMI display to prevent the user from selecting an input.

In an example having one or more features of the method of operating a vehicle system of any of the previous paragraphs, an icon representing the input on the HMI display is disabled.

In an example having one or more features of the method of operating a vehicle system of any of the previous paragraphs, the controller circuit processes a second user input through an alternate electrical circuit and/or logical path, thereby inhibiting the potential system failures.

In an example having one or more features of the method of operating a vehicle system of any of the previous paragraphs, the controller circuit preloads a memory of the system with data related to a most likely potential second input, thereby reducing a system latency.

In an example having one or more features of the method of operating a vehicle system of any of the previous paragraphs, the most likely potential second input is based on a user input history.

In an example having one or more features of the method of operating a vehicle system of any of the previous paragraphs, the most likely potential second input is based on crowd sourced data collected from identical systems installed in other vehicles.

In an example having one or more features of the method of operating a vehicle system of any of the previous paragraphs, the controller circuit learns the potential system failures based on a user input history.

In an example having one or more features of the method of operating a vehicle system of any of the previous paragraphs, the controller circuit learns the potential system failures based on crowd sourced data collected from identical systems installed in other vehicles.

In an example having one or more features of the method of operating a vehicle system of any of the previous paragraphs, the controller circuit downloads data indicative of the potential system failures.

In an example having one or more features of the method of operating a vehicle system of any of the previous paragraphs, the controller circuit further classifies the potential system failures by a severity rating.

In an example having one or more features of the method of operating a vehicle system of any of the previous paragraphs, the severity rating is indicative of a level of distraction to the user.

In an example having one or more features of the method of operating a vehicle system of any of the previous paragraphs, the severity rating is indicative of at least one of a system latency, a system crash, and a system reboot.

In an example having one or more features of the method of operating a vehicle system of any of the previous paragraphs, data collected from one or more vehicles experiencing system failures includes at least one of a time stamp, the input sequence, and a system state preceding a system failure event.

BRIEF DESCRIPTION OF DRAWINGS

The present invention will now be described, by way of example with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
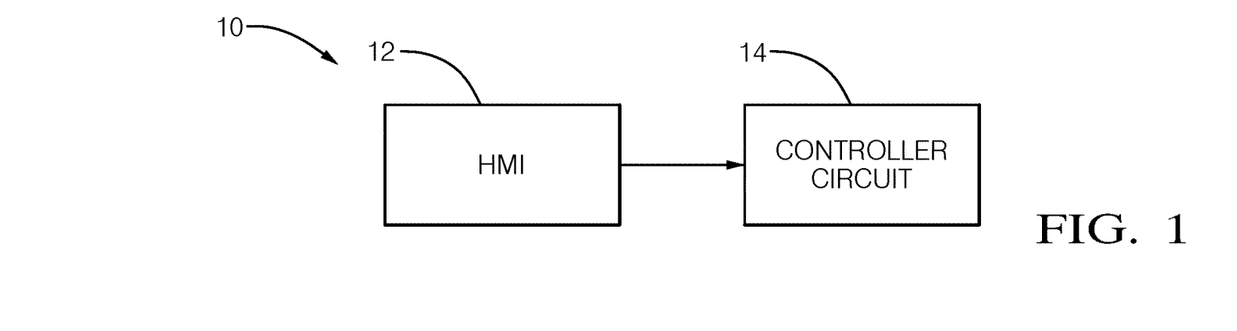
FIG. 1 is an illustration of a vehicle system in accordance with one embodiment.

FIG. 1 illustrates a vehicle system 10, hereafter the system 10, that avoids a system failure that may be caused by a sequence of user inputs. As used herein, a system failure includes any undesirable change in system performance including, but not limited to, a system crash, a system reboot, a delayed response or latency of the system 10 to an input, an audio glitch, a dropped phone call, etc. The system 10 includes one or more human machine interface 12 (HMI 12) for a vehicle that accept inputs from a user. The HMI 12 may be any HMI 12 associated with a vehicle subsystem, including, but not limited to, an audio interface, a navigation interface, a communication interface, a climate control interface, or any vehicle operating system interface that may be configured to accept the input from the user. In an example, the HMI 12 includes a touch screen having icons that represent a particular input command unique to a vehicle subsystem. In another example, the HMI 12 includes switches and/or knobs that may be adjusted to input the particular command, such as adjusting a volume of an audio speaker, and/or turning a light on and off. In another example, the HMI 12 includes buttons on a steering wheel of the vehicle that are inputs to a driver information center displayed on the vehicle's instrument cluster.

The system 10 includes a controller circuit 14 communicatively coupled to the HMI 12. The controller circuit 14 may include a processor (not shown) such as a microprocessor or other control circuitry such as analog and/or digital control circuitry. The control circuitry may include one or more application-specific integrated circuits (ASICs) or field programmable gate arrays (FPGAs) that are programmed to perform the techniques, or may include one or more general purpose hardware processors programmed to perform the techniques pursuant to program instructions in firmware, memory, other storage, or a combination. The controller circuit 14 may also combine custom hard-wired logic, ASICs, or FPGAs with custom programming to accomplish the techniques. The controller circuit 14 may include a memory or storage media (not shown), including non-volatile memory, such as electrically erasable programmable read-only memory (EEPROM) for storing one or more routines, thresholds, and captured data. The EEPROM stores data and allows individual bytes to be erased and reprogrammed by applying special programming signals. The controller circuit 14 may include other examples of non-volatile memory, such as flash memory, read-only memory (ROM), programmable read-only memory (PROM), and erasable programmable read-only memory (EPROM). The controller circuit 14 may include volatile memory, such as dynamic random-access memory (DRAM), static random-access memory (SRAM). The one or more routines may be executed by the processor to perform steps for avoiding system failures based on signals received by the controller circuit 14 from the HMI 12 as described herein. In an example, the HMI 12 includes the controller circuit 14 (i.e., the controller circuit 14 is integral to the HMI 12 electrical packaging). In another example, the HMI 12 and the controller circuit 14 are separate devices.

Figure 2:
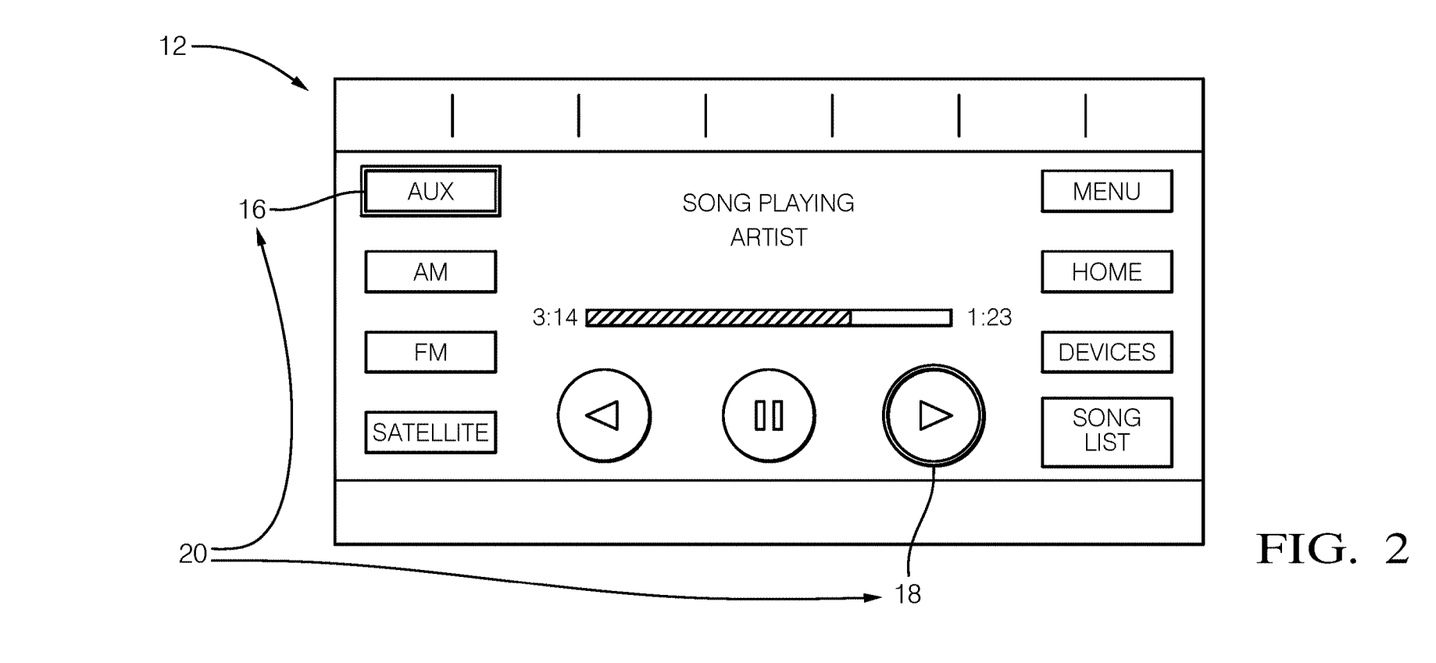
FIG. 2 is an illustration of a human machine interface of the vehicle system of FIG. 1 in accordance with one embodiment.

FIG. 2 illustrates an example of the HMI 12 isolated from the system 10. In this example, the HMI 12 is the audio interface on a vehicle console that is indicating a song playing from the user's remote device (e.g., a smartphone—not shown). The remote device may be connected to the system 10 via a cable, or via a wireless connection such as Bluetooth®, Wi-Fi, ultra-wide band (UWB), or near field communication (NFC).

The controller circuit 14 is configured to receive a first input 16 from the user via the HMI 12. In an example, the first input 16 is the user's selection of a particular function via HMI 12. Examples of the first input 16 include, but are not limited to, selecting an audio function, a phone function, a navigation function, or other vehicle functions, such as vehicle headlights, vehicle interior lights, advanced driver safety system (ADAS) functions, cruise control, vehicle information center functions, etc. In the example illustrated in FIG. 2, the first input 16 is the user's selection of the AUX icon in order to access music stored on the user's smartphone.

The controller circuit 14 is further configured to anticipate a potential second input 18 from the user via the HMI 12. That is, the controller circuit 14 determines a next selection that the user is likely to make via the HMI 12, before the user makes the selection. In an example, the potential second input 18 is based on the current HMI 12 options being displayed to the user. In this example, the potential second input 18 may be any of the icons displayed on the audio interface HMI 12, such as the forward and/or reverse icons to move between songs, the pause icon, the song list icon, etc. In another example, the potential second input 18 may be made to any of the other vehicle interfaces other than the audio interface HMI 12, such as those described above.

In an example, the controller circuit 14 anticipates the potential second input 18 based on historical interaction data between the user and the HMI 12. In this example, the controller circuit 14 learns over time, using any of the known machine learning routines, that the user will likely select a particular icon (e.g., the forward icon on the HMI 12 to skip a song) based on the user's input history.

Machine learning is a data analytics technique that teaches computers to learn from experience. Machine learning routines, or algorithms, use computational methods to learn information from data without relying on a predetermined equation as a model. The routines improve their performance as the sample size available for learning increases. Machine learning uses two types of techniques: supervised learning, which trains a model on known input and output data so that it can predict future outputs, and unsupervised learning, which finds hidden patterns or intrinsic structures in input data. Supervised learning uses classification and regression techniques to develop predictive models. Common algorithms for performing classification include support vector machine (SVM), boosted and bagged decision trees, k-nearest neighbor, Naïve Bayes, discriminant analysis, logistic regression, and neural networks. Common regression algorithms include linear model, nonlinear model, regularization, stepwise regression, boosted and bagged decision trees, neural networks, and adaptive neuro-fuzzy learning. Unsupervised learning finds hidden patterns or intrinsic structures in data. It is used to draw inferences from datasets consisting of input data without labeled responses. Clustering is a common unsupervised learning technique. Common algorithms for performing clustering include k-means and k-medoids, hierarchical clustering, Gaussian mixture models, hidden Markov models, self-organizing maps, fuzzy c-means clustering, and subtractive clustering.

In another example, the controller circuit 14 anticipates the potential second input 18 based on crowd sourced data from other users of identical systems in other vehicles. In this example, the memory in the controller circuit 14 includes information regarding a likelihood of the user's potential second input 18 based on the crowd sourced data, as will be described in more detail below. The crowd sourced data is processed using any of the known machine learning routines described above to determine the likelihood of the user's potential second input 18. In an example, the controller circuit 14 downloads the crowd sourced data indicative of the potential system failures via an over-the-air (OTA) transmission from a cloud computing environment, sometimes referred to as "the cloud". In another example, the data indicative of the potential system failures is downloaded to the controller circuit 14 during vehicle assembly. In another example, the data indicative of the potential system failures is downloaded to the controller circuit 14 during a vehicle service visit.

Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. The cloud computing environment includes one or more cloud data centers. In general a cloud data center refers to the physical arrangement of servers that make up a cloud, or a particular portion of a cloud. For example, servers are physically arranged in the cloud datacenter into rooms, groups, rows, and racks. The cloud includes cloud data centers along with the network and networking resources (for example, networking equipment, nodes, routers, switches, and networking cables) that interconnect the cloud data centers and help facilitate the systems' 10 access to cloud computing services. In an example, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in examples where the network represents a combination of multiple sub-networks, different network layer protocols are used at each of the underlying sub-networks. In some examples, the network represents one or more interconnected internetworks, such as the public Internet. In an example, the system 10 is connected to the cloud through network links and network adapters.

The controller circuit 14 determines potential system failures based on at least one of an operating state of the system 10, and the potential second input 18 from the user. The controller circuit 14 includes a data collection software component that uses various data sources inherent in the operating system (OS), hardware, and/or other knowledge of the system 10 to periodically collect and package data representative of the current state of the system 10, based on failure events and/or the user's inputs. Data collected from one or more vehicles experiencing system failures includes at least one of a time stamp, the input sequence 20, and the system state preceding the system failure event. The current state of the system 10 is characterized by, but is not limited to, a current software release, a set of installed applications and their versions, processes currently running on the system 10, central processor unit (CPU) usage, memory usage, system temperature, error messages, system crashes, etc. The collected data from the various data sources described above is combined with historical records of system failure events to more completely define the current state of the system 10. This data is analyzed by the controller circuit 14 and/or transferred to the cloud computing environment for storage and further data analysis.

The controller circuit 14 determines, based on historical data, whether an input sequence 20, comprising the first input 16 from the user and the potential second input 18 from the user, is likely to impact performance of the system 10, and/or impact performance of one or more components of the system 10. The historical data, analyzed and downloaded from the cloud, and/or analyzed on the vehicle, identifies the potential system failures and the associated input sequences 20 that led up to the known historical system failure events. In an example, the system failures include error message content (e.g., "SIGSEG" memory error messages). In another example, the system failures include a response latency (i.e., a delay) to a user input that exceeds a defined threshold (e.g., a screen change taking longer than two seconds after a button or icon press). In another example, the system failures include an anomaly identified by a machine learning model, or other statistical derived metric, indicating a deterioration in a performance characteristic of the system 10. In this example, a machine learning anomaly detection model may be trained on data from a single user/single vehicle, and/or may be trained on data from a fleet of similarly-configured vehicles (i.e., from crowd sourced data), to recognize a "normal" versus an "abnormal" system behavior indicative of a system failure. In an example, the trained model analyzes current data to indicate a "likelihood of anomaly" metric that may be used with a threshold to identify the system failure. For example, if the likelihood of anomaly is greater than a 90% threshold, a system failure is likely to occur. Other threshold levels m ay be user defined based on the failure rates.

In an example, the system state and failure events are also captured and stored with times tamps. In this example, the identified failure modes can be further characterized by which system state and event history preceded the system failure.

In an example, data collected and transferred to the cloud, and/or stored on the vehicle, is analyzed for patterns of user behavior. The user may develop patterns of behavior such that a likelihood of a next user input (i.e., the potential second input 18) can be predicted with an associated probability. User input sequences 20 are stored by the controller circuit 14 as they occur, and/or are uploaded to the cloud. The current system state is also stored by the controller circuit 14 with associated time stamps. In an example, a look-up table of historical user input sequences 20 with time stamps, along with the associated system state, is accessed by the controller circuit 14 to identify historical events similar to the current system state and the current user's first input 16 (e.g., the current active application and the previous button press matches the data in the look-up table). Based on the current system state and the input sequence 20 history, a probability of each potential second input 18 may be calculated.

In an example, the controller circuit 14 further classifies the potential system failures by a severity rating that is indicative of at least one of a level of distraction to the user, a system latency, a system crash, and a system reboot. In an example, a higher severity rating is applied to potential system failures that may lead to safety issues, such as distracting the user who may also be an operator of the vehicle. In another example, a lower severity rating is applied to system failures that may result in only a minor inconvenience to the user, such as the system latency that does not exceed a time threshold. In another example, a system latency failure that exceeds the time threshold may receive an increased severity rating, as the increased delay time may lead to an increase in the users level of distraction. In another example, a system crash and/or a system reboot may receive an increased severity rating due to the unavailability of the system 10, and/or an increased user distraction level. Other factors may be used to determine the severity rating, including, but not limited to, a likelihood of occurrence of the system failure, a time for the system 10 to recover from the failure, the ability of the system 10 to apply a countermeasure to avoid the failure, historical user data, current vehicle environment, and the historical crowd sourced data.

In an example, the controller circuit 14 determines that the input sequence 20 is likely to result in the anticipated impact to the performance of the system 10, and/or the one or more components of the system 10, and enacts at least one countermeasure to avoid or reduce the impact to the system 10. In an example, the controller circuit 14 enacts the countermeasure based on a severity rating threshold. In this example, when the controller circuit 14 determines that the severity rating is greater than the severity rating threshold, the controller circuit 14 enacts the countermeasure to avoid the system failure. The controller circuit 14 may evaluate the viability of one or more countermeasures before selecting a preferred countermeasure to enact. Furthermore, when the controller circuit 14 determines that the severity rating is less than the severity rating threshold, the controller circuit 14 may not enact the countermeasure, or may elect an alternate countermeasure based on the current system state.

In an example, the controller circuit 14 enacts the countermeasure of modifying the HMI 12 display to prevent the user from selecting an input. In this example, an icon representing the input on the HMI 12 display is disabled (i.e., greyed-out and/removed from the HMI 12). Referring back to the example of the HMI 12 illustrated in FIG. 2, the audio system is operating and the controller circuit 14 determines that the CPU usage is 90%, with the memory usage of 15%. The HMI 12 is displaying the media player screen showing the options of "pause", "next", "previous", and "song list", among others. Historical data downloaded from the cloud, from 100,000 other vehicles that have the same version of the media player application, indicates that when the CPU usage is greater than 80%, and the user selects the "song list" option, the media player application is 95% likely to crash. In this example, the severity rating for this failure is above the severity rating threshold (i.e., a system crash is more than likely to occur if the "song list" option is selected), and the controller circuit 14 avoids the system failure by disabling the "song list" option until the system state changes to a condition where the likelihood of a system failure is diminished. In this example, the HMI 12 may display a message to the user that the feature is not currently available when the user selects the "song list" option.

In another example, the controller circuit 14 enacts the countermeasure of processing a second user input through an alternate path, such as an alternate electrical circuit, thereby inhibiting the potential system failures. Referring again to the previous example where the "song list" option, if selected, would more than likely cause the system crash, the controller circuit 14 may first determine whether the alternate path exists in the infotainment system to display the song list to the user, and still avoid the system crash. That is, the controller circuit 14 evaluates whether another way exists to present the song list on the HMI 12 without causing the infotainment system to crash. In this example, an alternate path to display the song list is defined for the controller circuit 14, and the controller circuit 14 displays the song list when the user selects the "song list" icon. In this example the icon on HMI 12 remains unchanged allowing the user to select the icon, even though an alternate path is used to display the song list.

In another example, the controller circuit 14 enacts the countermeasure of preloading a memory of the system 10 with data related to a most likely potential second input 18, thereby reducing the system latency. Referring again to the example of the HMI 12 illustrated in FIG. 2, the audio system is operating and the controller circuit 14 determines that the CPU usage is 95%, with the memory usage of 20%. The HMI 12 is displaying the media player screen showing the options of "pause", "next", "previous", and "song list", among others. Historical data downloaded from the cloud, from 100,000 other vehicles that have the same version of the media player application, indicates that the likelihood of the user's potential second input 18 in the next ten seconds are: "pause" 2%; "next" 65%; "previous" 5%, and "song list" 2%. Based on exceeding a likeliness threshold (e.g., greater than 50%) that the "next" option will be selected by the user, the controller circuit 14 preloads the next song into the memory, thereby reducing the delay time of the audio system when the user eventually selects the "next" option.

While the examples above describe the use of crowd sourced data to determine the user's potential second input 18, it will be understood that data from the single user and/or single vehicle may be used alone or in combination with the crowd sourced data to avoid system failures.

Figure 3:
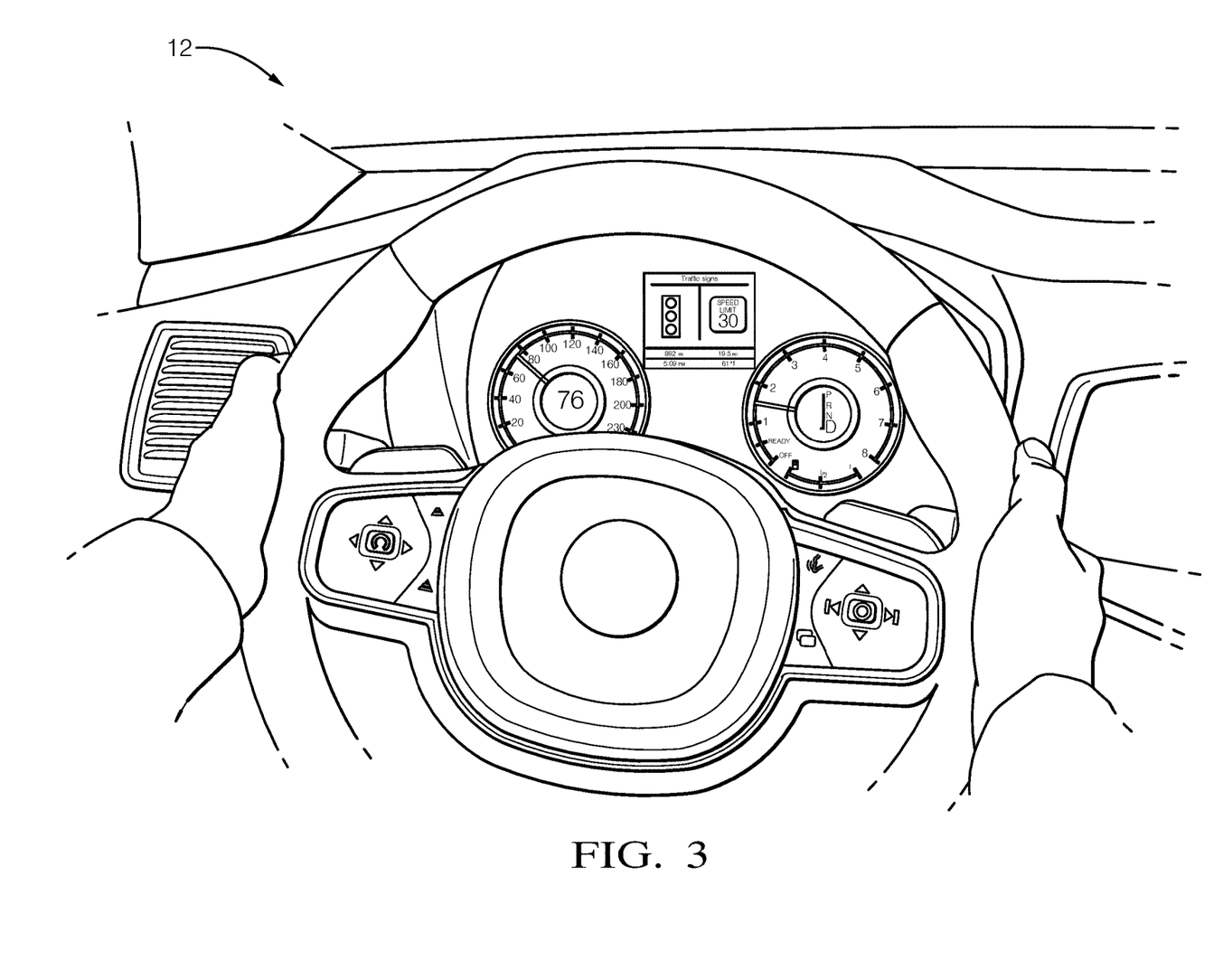
FIG. 3 is an illustration of another human machine interface of the vehicle system of FIG. 1 in accordance with one embodiment.

FIG. 3 is an illustration of another example if the HMI 12 for the vehicle. In this example, the HMI 12 is a driver information section of an instrument cluster display that may be interacted with via buttons on the a steering wheel. It will be appreciated that the examples above describing the audio system HMI 12 of FIG. 2 will also apply to the driver information HMI 12 of FIG. 3.

Figure 4:
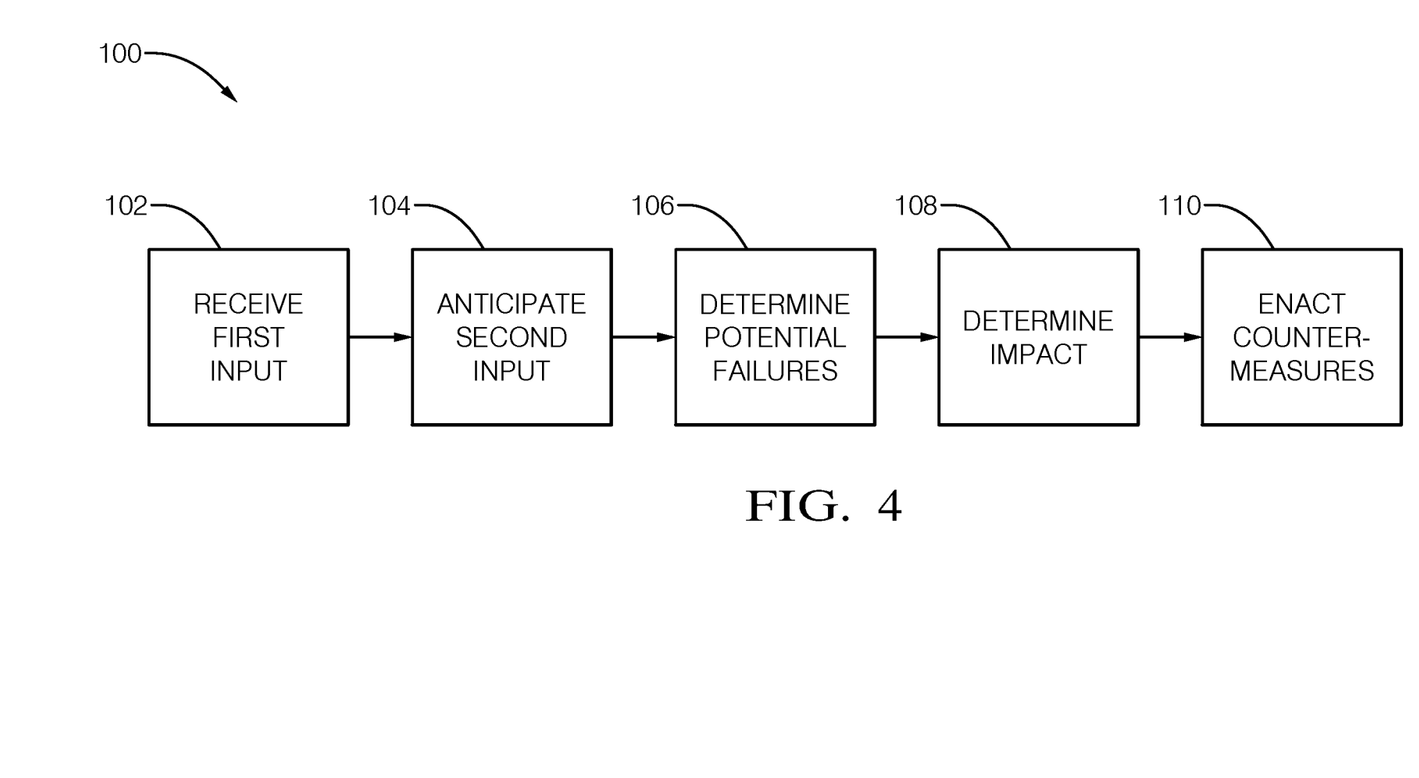
FIG. 4 is a flow chart illustrating a method of operating the vehicle system of FIG. 1 in accordance with another embodiment.

FIG. 4 is a flow chart illustrating an example of a method 100

Step 102, RECEIVE FIRST INPUT, includes receiving, with a controller circuit 14, a first input 16 from a user via a human machine interface (HMI) 12 for a vehicle, as described above. The controller circuit 14 is communicatively coupled to the HMI 12. The first input 16 may be the user's selection of a particular function via the HMI 12, including selecting an audio function, a phone function, a navigation function, or other vehicle functions, such as vehicle headlights, vehicle interior lights, advanced driver safety system (ADAS) functions, cruise control, and vehicle information center functions, etc.

Step 104, ANTICIPATE SECOND INPUT, includes anticipating, with the controller circuit 14, a potential second input 18 from the user via the HMI 12, as described above. The controller circuit 14 anticipates, or predicts, the users' most likely potential second input 18 based on historical data collected from the user and vehicle, and/or from crowd sourced data collected from may vehicles, as described above.

Step 106, DETERMINE POTENTIAL FAILURES, includes determining, with the controller circuit 14, potential system failures based on at least one of an operating state of the system 10 and the potential second input 18, as described above. Data collected from one or more vehicles experiencing system failures includes at least one of a time stamp, the input sequence 20, and the system state preceding the system failure event.

Step 108, DETERMINE IMPACT, includes determining, with the controller circuit 14, based on historical data whether an input sequence 20 comprising the first input 16 from the user and the potential second input 18 from the user is likely to impact performance of the system 10 and or one or more components of the system 10. The historical data, analyzed and downloaded from the cloud, and/or analyzed on the vehicle, identifies the potential system failures and the associated input sequences 20 that led up to the known historical system failure events, as described above.

Step 110, ENACT COUNTERMEASURES, includes enacting, with the controller circuit 14, at least one countermeasure to avoid or reduce the impact. If the input sequence 20 is likely to result in the impact to the performance of the system 10 and or the one or more components of the system 10, the controller circuit 14 determines a preferred countermeasure to avoid the system failure. In an example, the controller circuit 14 enacts the countermeasure based on a severity rating threshold, as described above. In an example, the controller circuit 14 disables a function of the HMI 12 to avoid the system failure. In another example, the controller circuit 14 finds an alternate path to avoid the system failure. In yet another example, the controller circuit 14 preloads data to avoid the system failure.

Accordingly, a vehicle system 10 and a method 100 of operating the vehicle system 10 are provided. The vehicle system 10 may provide advantages over other vehicle systems because the vehicle system 10 adapts to avoid system failures based on historical data.

While this invention has been described in terms of the preferred embodiments thereof, it is not intended to be so limited, but rather only to the extent set forth in the claims that follow. "One or more" includes a function being performed by one element, a function being performed by more than one element, e.g., in a distributed fashion, several functions being performed by one element, several functions being performed by several elements, or any combination of the above. It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact. The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

We claim:

1. A vehicle system, comprising:
   a human machine interface (HMI) for a vehicle that accepts inputs from a user; and a controller circuit communicatively coupled to the HMI, the controller circuit configured to:
  receive a first input from the user via the HMI, the first input being a selected function of the vehicle;
  before receiving a second input from the user via the HMI, anticipate a potential second input from the user via the HMI, the potential second input being a selectable option related to the selected function;
  determine one or more potential system failures related to the selected function based on an operating state of the vehicle system and the potential second input;
  determine, based on crowd sourced data, whether a probability that an input sequence comprising the first input from the user and the potential second input from the user impacts a performance of the selected function is above a predetermined threshold; and
  when the probability that the input sequence impacts the performance of the selected function is above the predetermined threshold, enact at least one countermeasure to avoid the one or more potential system failures.

2. The vehicle system of claim 1, wherein the controller circuit is further configured to process the second input through an alternate electrical circuit.

3. The vehicle system of claim 1, wherein the controller circuit is further configured to learn the one or more potential system failures based on a user input history.

4. The vehicle system of claim 1, wherein the controller circuit is further configured to learn the one or more potential system failures based on the crowd sourced data collected from an identical system installed in other vehicles.

5. The vehicle system of claim 1, wherein the controller circuit is further configured to download data indicative of the one or more potential system failures.

6. The vehicle system of claim 1, wherein the crowd sourced data includes at least one of a time stamp, the input sequence, and a system state preceding a system failure event.

7. The vehicle system of claim 1, wherein the controller circuit is further configured to modify an HMI display to prevent the user from selecting the selectable option related to the selected function.

8. The vehicle system of claim 7, wherein an icon representing the selectable option on the HMI display is disabled.

9. The vehicle system of claim 1, wherein the controller circuit is further configured to preload a memory of the vehicle system with data related to a potential third input, the potential third input being another selectable option related to the selected function and exceeding a predetermined threshold.

10. The vehicle system of claim 9, wherein the potential third input is based on a user input history.

11. The vehicle system of claim 9, wherein the potential third input is based on additional crowd sourced data collected from an identical system installed in other vehicles.

12. The vehicle system of claim 1, wherein the controller circuit is further configured to classify the one or more potential system failures by a severity rating.

13. The vehicle system of claim 12, wherein the severity rating is indicative of a level of distraction to the user.

14. The vehicle system of claim 12, wherein the severity rating is indicative of at least one of a system latency, a system crash, or a system reboot.

15. A method of operating a vehicle system, comprising:
  receiving, with a controller circuit communicatively coupled to the HMI, a first input from a user via a human machine interface (HMI) for a vehicle, the first input being a selected function of the vehicle;
  before receiving a second input from the user via the HMI, anticipating, with the controller circuit, a potential second input from the user via the HMI, the potential second input being a selectable option related to the selected function;
  determining, with the controller circuit, one or more potential system failures related to the selected function based on an operating state of the vehicle system and the potential second input;
  determining, with the controller circuit and based on crowd sourced data, whether a probability that an input sequence comprising the first input from the user and the potential second input from the user impacts a performance of the selected function is above a predetermined threshold; and
  when the probability that the input sequence impacts the performance of the selected function is above the predetermined threshold, enacting, with the controller circuit, at least one countermeasure to avoid the one or more potential system failures.

16. The method of claim 15, the method further comprising processing, with the controller circuit, the second input through an alternate electrical circuit.

17. The method of claim 15, the method further comprising learning, with the controller circuit, the one or more potential system failures based on a user input history.

18. The method of claim 15, the method further comprising learning, with the controller circuit, the one or more potential system failures based on the crowd sourced data collected from an identical system installed in other vehicles.

19. The method of claim 15, the method further comprising downloading, with the controller circuit, data indicative of the one or more potential system failures.

20. The method of claim 15, wherein the crowd sourced data includes at least one of a time stamp, the input sequence, and a system state preceding a system failure event.

21. The method of claim 15, the method further comprising modifying, with the controller circuit, an HMI display to prevent the user from selecting the selectable option related to the selected function.

22. The method of claim 21, wherein an icon representing the selectable option on the HMI display is disabled.

23. The method of claim 15, the method further comprising preloading, with the controller circuit, a memory of the vehicle system with data related to a potential third input, the potential third input being another selectable option related to the selected function and exceeding a predetermined threshold.

24. The method of claim 23, wherein the potential third input is based on a user input history.

25. The method of claim 23, wherein the potential third input is based on additional crowd sourced data collected from an identical system installed in other vehicles.

26. The method of claim 15, the method further comprising classifying, with the controller circuit, the one or more potential system failures by a severity rating.

27. The method of claim 26, wherein the severity rating is indicative of a level of distraction to the user.

28. The method of claim 26, wherein the severity rating is indicative of at least one of a system latency, a system crash, or a system reboot.

\* \* \* \* \*